US012647266B2

(12) United States Patent
Manickam et al.

(10) Patent No.: US 12,647,266 B2
(45) Date of Patent: Jun. 2, 2026

(54) EFFICIENT AND SECURE HOP-BY-HOP ROUTING IN HIERARCHICAL MULTI-REGION-FABRIC NETWORKS

(71) Applicant: Cisco Technology, Inc., San Jose, CA (US)

(72) Inventors: Arul Murugan Manickam, Mountain House, CA (US); Basavaraju Halappa, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 65 days.

(21) Appl. No.: 18/905,930

(22) Filed: Oct. 3, 2024

(65) Prior Publication Data

US 2026/0100831 A1 Apr. 9, 2026

(51) Int. Cl.
*H04L 9/14* (2006.01)

(52) U.S. Cl.
CPC ...................................... *H04L 9/14* (2013.01)

(58) Field of Classification Search
CPC ........................................................ H04L 9/14
See application file for complete search history.

(56) References Cited

U.S. PATENT DOCUMENTS

| | | | | |
|---|---|---|---|---|
| 11,245,617 B1 * | 2/2022 | Bonica | .................. | H04L 45/745 |
| 11,394,636 B1 * | 7/2022 | Walker | .................. | H04L 47/125 |
| 11,936,613 B2 * | 3/2024 | Wing | .................... | H04L 63/061 |

| | | | | |
|---|---|---|---|---|
| 12,199,958 B1 * | 1/2025 | Layton | ................ | H04L 63/0428 |
| 2004/0205332 A1 * | 10/2004 | Bouchard | ............. | H04L 63/164 |
| | | | | 713/153 |
| 2008/0065890 A1 | 3/2008 | Lundsgaard | | |
| 2017/0289114 A1 * | 10/2017 | Wood | .................. | H04L 63/0435 |
| 2017/0324654 A1 | 11/2017 | Previdi et al. | | |
| 2018/0219783 A1 * | 8/2018 | Pfister | .................. | H04L 45/745 |
| 2019/0104064 A1 * | 4/2019 | Cidon | .................... | H04L 12/14 |
| 2019/0158605 A1 * | 5/2019 | Markuze | ............. | H04L 12/4641 |
| 2020/0106702 A1 * | 4/2020 | Acharya | ................. | H04L 63/20 |
| 2020/0358698 A1 | 11/2020 | Song et al. | | |
| 2021/0034790 A1 * | 2/2021 | Charles | ................. | H04L 9/0825 |
| 2021/0092054 A1 * | 3/2021 | Kondapavuluru | ...... | H04L 45/74 |
| 2021/0399983 A1 * | 12/2021 | Blatt | ..................... | H04L 9/3236 |
| 2021/0409323 A1 * | 12/2021 | Menon | ................... | H04L 12/46 |

(Continued)

FOREIGN PATENT DOCUMENTS

| | | | | |
|---|---|---|---|---|
| WO | 2019105462 A1 | 6/2019 | | |
| WO | 2023114351 A1 | 6/2023 | | |
| WO | WO-2024124260 A2 * | 6/2024 | ............. | H04L 45/04 |

*Primary Examiner* — Darren B Schwartz
(74) *Attorney, Agent, or Firm* — Lee & Hayes, P.C.

(57) ABSTRACT

In one embodiment, an illustrative method herein may comprise: receiving, at a device in a computer network, a packet having an unencrypted header and an encrypted segment list, wherein the device is an authorized segment hop device and wherein a destination address within the unencrypted header matches an address of the device; decrypting, by the device and in response to the destination address within the unencrypted header matching the address of the device, the encrypted segment list to expose at least a next segment hop address in the encrypted segment list; replacing, by the device, the destination address within the unencrypted header with the next segment hop address; and forwarding, from the device, the packet toward the next segment hop address along with the encrypted segment list.

19 Claims, 11 Drawing Sheets

(56)    References Cited

U.S. PATENT DOCUMENTS

| | | | | |
|---|---|---|---|---|
| 2022/0103535 | A1* | 3/2022 | Chifor ................... | H04L 63/061 |
| 2022/0166713 | A1* | 5/2022 | Markuze ................ | H04L 45/42 |
| 2022/0417254 | A1* | 12/2022 | Michaelis .............. | H04L 45/02 |
| 2023/0131877 | A1* | 4/2023 | Menon .................. | H04L 9/0825 |
| | | | | 713/171 |
| 2023/0327983 | A1* | 10/2023 | Song .................... | H04L 45/123 |
| | | | | 370/392 |
| 2023/0388233 | A1* | 11/2023 | Thoria ................... | H04L 45/04 |
| 2024/0039702 | A1* | 2/2024 | Crawshaw ............ | H04L 9/3263 |
| 2024/0106740 | A1* | 3/2024 | Chang ................... | H04L 63/12 |
| 2024/0113902 | A1* | 4/2024 | Michaelis ............... | H04L 9/50 |
| 2024/0205205 | A1* | 6/2024 | Hou ....................... | H04L 45/34 |
| 2025/0343677 | A1* | 11/2025 | Inamdar ............. | H04L 63/0428 |

* cited by examiner

EFFICIENT AND SECURE HOP-BY-HOP ROUTING IN HIERARCHICAL MULTI-REGION-FABRIC NETWORKS

TECHNICAL FIELD

The present disclosure relates generally to computer networks, and, more particularly, to efficient and secure hop-by-hop routing in hierarchical multi-region-fabric networks.

BACKGROUND

In hierarchical multi-region software defined wide area networks (SD-WANs or SDWANs), a packet's path involves multiple hub routers along the way. Additionally, the packet typically traverses multiple service providers' networks as it flows through these hubs.

For secure packet forwarding, the packet payload is typically sent encrypted over Internet Protocol Security (IPSec) tunnels, where encryption is done using the IPSec credentials of the immediate next-hop router, such that this next-hop router is able to authenticate the packet, such as through an Authentication Header (AH) header of IPSec. However, this means that the Encapsulating Security Payload (ESP) encryption is also typically done using the IPSec credentials of the immediate next-hop router.

As a result of this, each intermediate hub router needs to decrypt the packet to extract the inner Internet Protocol (IP) header for doing IP lookup and then re-encrypt the packet using the IPSec credentials of its immediate next-hop router. This method of doing encrypt/decrypt multiple times along the path of the packet is expensive and reduces the overall traffic throughput. Moreover, in the conventional approach, any virtual routing and forwarding (VRF) routes need to be present in the intermediate hubs, since route lookup is performed after decryption.

BRIEF DESCRIPTION OF THE DRA WINGS

The embodiments herein may be better understood by referring to the following description in conjunction with the accompanying drawings in which like reference numerals indicate identically or functionally similar elements, of which:

Figure 8:
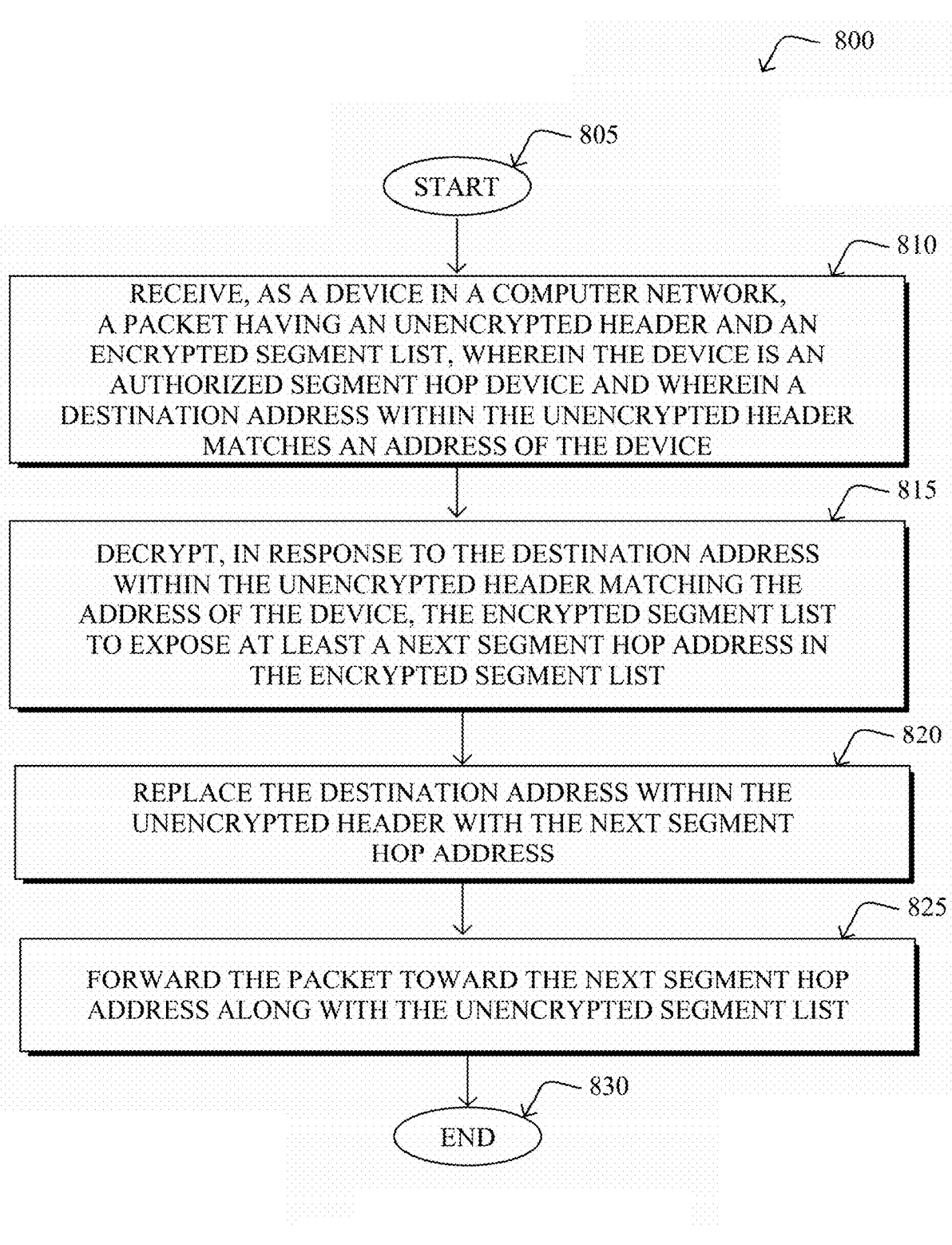
Figure 9:
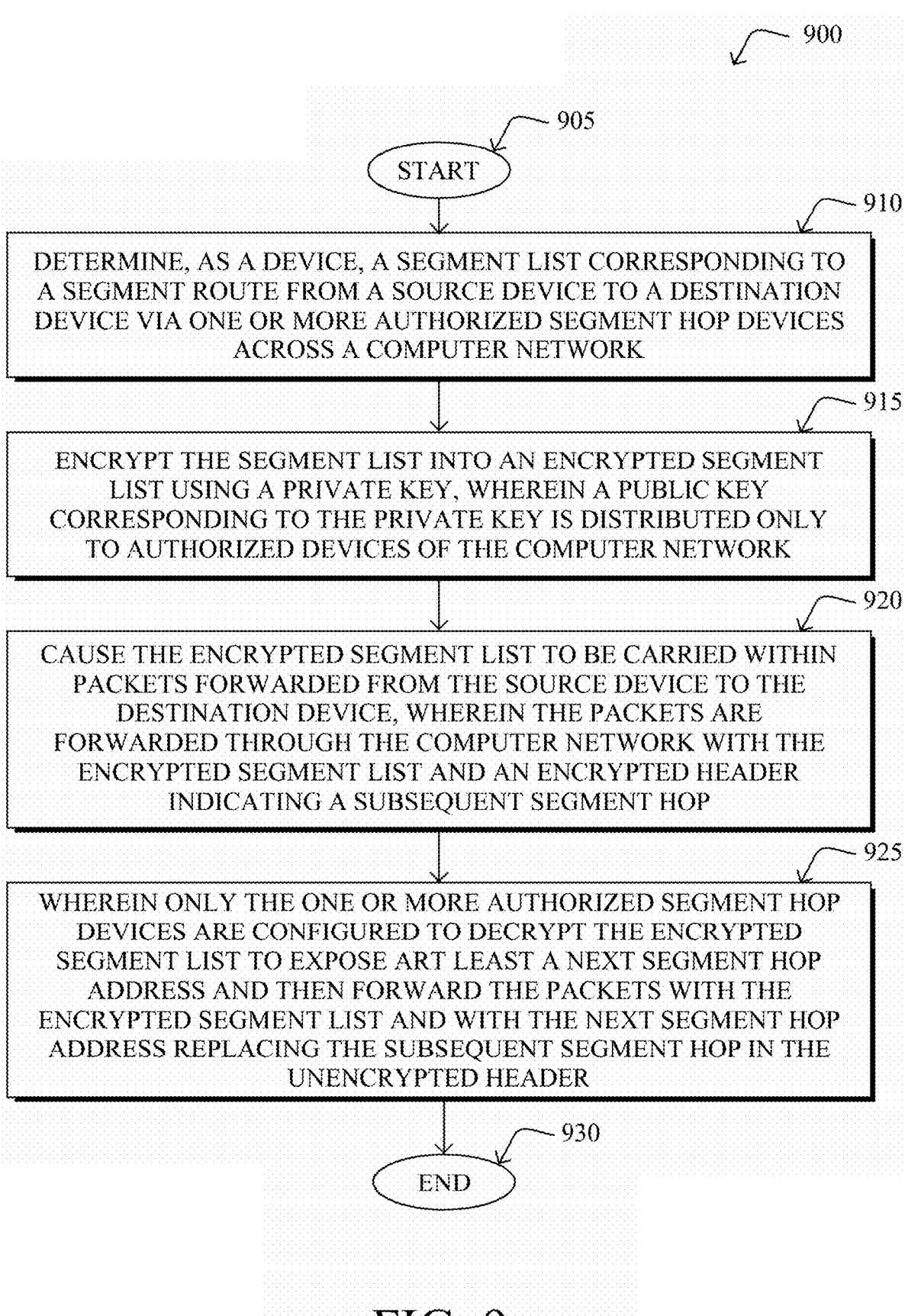

FIG. 8 illustrates an example procedure for efficient and secure hop-by-hop routing in hierarchical multi-region-fabric networks, particularly from the perspective of an authorized forwarding device (e.g., border router); and FIG. 9 illustrates another example procedure for efficient and secure hop-by-hop routing in hierarchical multi-region-fabric networks, particularly from the perspective of an encapsulating device (e.g., controller or sending/edge device).

DESCRIPTION OF EXAMPLE EMBODIMENTS

Overview

According to one or more embodiments of the disclosure, efficient and secure hop-by-hop routing in hierarchical multi-region-fabric networks is shown and described. In one embodiment, an illustrative method herein may comprise: receiving, at a device in a computer network, a packet having an unencrypted header and an encrypted segment list, wherein the device is an authorized segment hop device and wherein a destination address within the unencrypted header matches an address of the device; decrypting, by the device and in response to the destination address within the unencrypted header matching the address of the device, the encrypted segment list to expose at least a next segment hop address in the encrypted segment list; replacing, by the device, the destination address within the unencrypted header with the next segment hop address; and forwarding, from the device, the packet toward the next segment hop address along with the encrypted segment list.

In another embodiment, an illustrative method may comprise: determining, by a device, a segment list corresponding to a segment route from a source device to a destination device via one or more authorized segment hop devices across a computer network; encrypting, by the device, the segment list into an encrypted segment list using a private key, wherein a public key corresponding to the private key is distributed only to authorized devices of the computer network; and causing, by the device, the encrypted segment list to be carried within packets forwarded from the source device to the destination device, wherein the packets are forwarded through the computer network with the encrypted segment list and an unencrypted header indicating a subsequent segment hop, and wherein only the one or more authorized segment hop devices are configured to decrypt the encrypted segment list to expose at least a next segment hop address and then forward the packets with the encrypted segment list and with the next segment hop address replacing the subsequent segment hop in the unencrypted header.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
FIG. 1 illustrates an example computing system.
Figure 1:
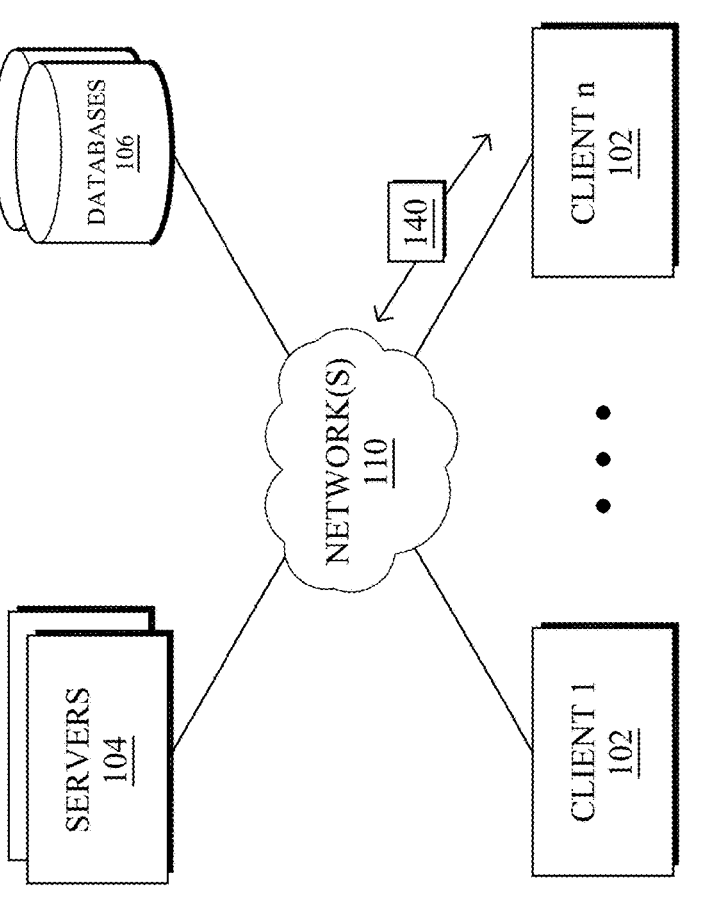

FIG. 1 is a schematic block diagram of an example simplified computing system (e.g., computing system 100) illustratively comprising any number of client devices (e.g., client devices 102, such as a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, the devices shown and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Network(s) 110 may include, for example, network backbones or other internetworking systems, and may include various customer edge (CE) routers interconnected with provider edge (PE) routers in order to communicate across a core network to provide connectivity between devices which may be located in different geographical areas and/or on different types of local networks (e.g., local/branch networks versus data center/cloud environments). For example, these routers may be interconnected by the public Internet, a multiprotocol label switching (MPLS) virtual private network (VPN), or the like. In some implementations, a router or a set of routers may be connected to a private network (e.g., dedicated leased lines, an optical network, etc.) or a VPN (e.g., MPLS VPN) thanks to a carrier network, via one or more links exhibiting different network and service level agreement characteristics.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IOT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art. Servers 104, for example, may be configured as a network controller/supervisory service located in a data center with databases 106, accordingly. For instance, servers 104 may include, in various implementations, a network management server (NMS), a dynamic host configuration protocol (DHCP) server, a constrained application protocol (CoAP) server, an outage management system (OMS), an application policy infrastructure controller (APIC), an application server, etc.

Those skilled in the art will also understand that any number of nodes, devices, links, etc. may be used in computing system 100, and that the view shown herein is for simplicity. As would also be appreciated, computing system 100 may include any number of local networks, data centers, cloud environments, devices/nodes, servers, etc. Also, those skilled in the art will further understand that while the network is shown in a certain orientation, the computing system 100 is merely an example illustration that is not meant to limit the disclosure.

For instance, smart object networks, such as sensor networks, in particular, are a specific type of network (e.g., computing system 100) having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Generally, size and cost constraints on smart object nodes (e.g., sensors) result in corresponding constraints on resources such as energy, memory, computational speed and bandwidth.

In some implementations, the techniques herein may be applied to still other network topologies and configurations. For example, the techniques herein may be applied to peering points with high-speed links, data centers, etc.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

According to various implementations, a software-defined WAN (SD-WAN) may be used in computing system 100 to connect local networks and data center/cloud environments. In general, an SD-WAN uses a software defined networking (SDN)-based approach to instantiate tunnels on top of the physical network and control routing decisions, accordingly. For example, one tunnel may connect a customer edge (CE) router at the edge of a local network to router a remote CE router at the edge of a data center/cloud environment over an MPLS or Internet-based service provider network in a network backbone. Similarly, a second tunnel may also connect these routers over a 4G/5G/LTE cellular service provider network. SD-WAN techniques allow the WAN functions to be virtualized, essentially forming a virtual connection between local networks and data center/cloud environments on top of the various underlying connections. Another feature of SD-WAN is centralized management by a supervisory service that can monitor and adjust the various connections, as needed.

Figure 2:
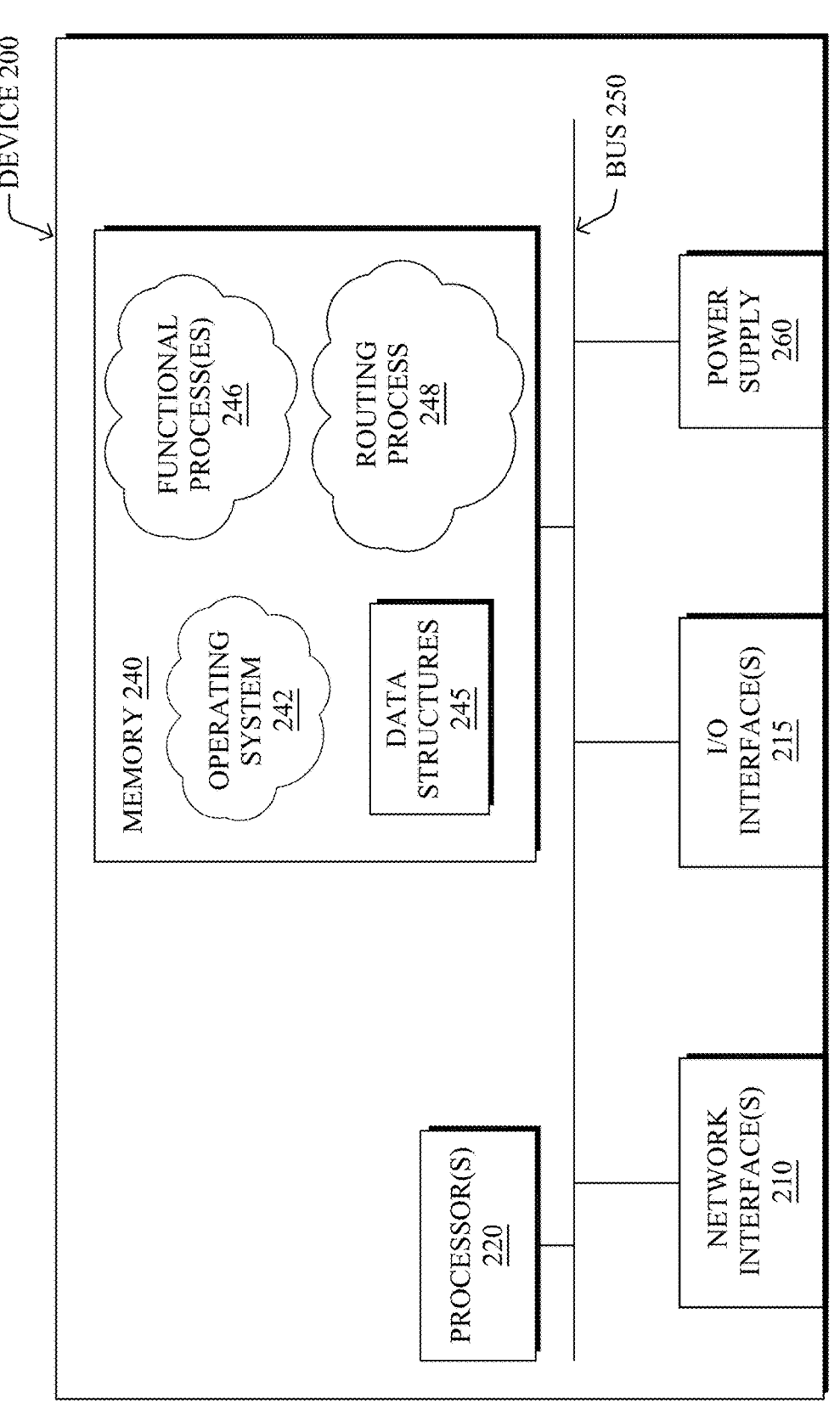
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), input/output interfaces (I/O interfaces 215, inclusive of any associated peripheral devices such as displays, keyboards, cameras, microphones, speakers, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 246, and on certain devices, a routing process (process 248), as described herein, each of which may alternatively be located within individual network interfaces.

Notably, one or more functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

Routing process (process 248) may include computer executable instructions executed by the processor(s) 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, the one or more functional processes 246 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, routing process (process 248) may further include computer executable instructions that, when executed by processor(s) 220, cause device 200 to perform the techniques described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different quality of service (QOS) at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
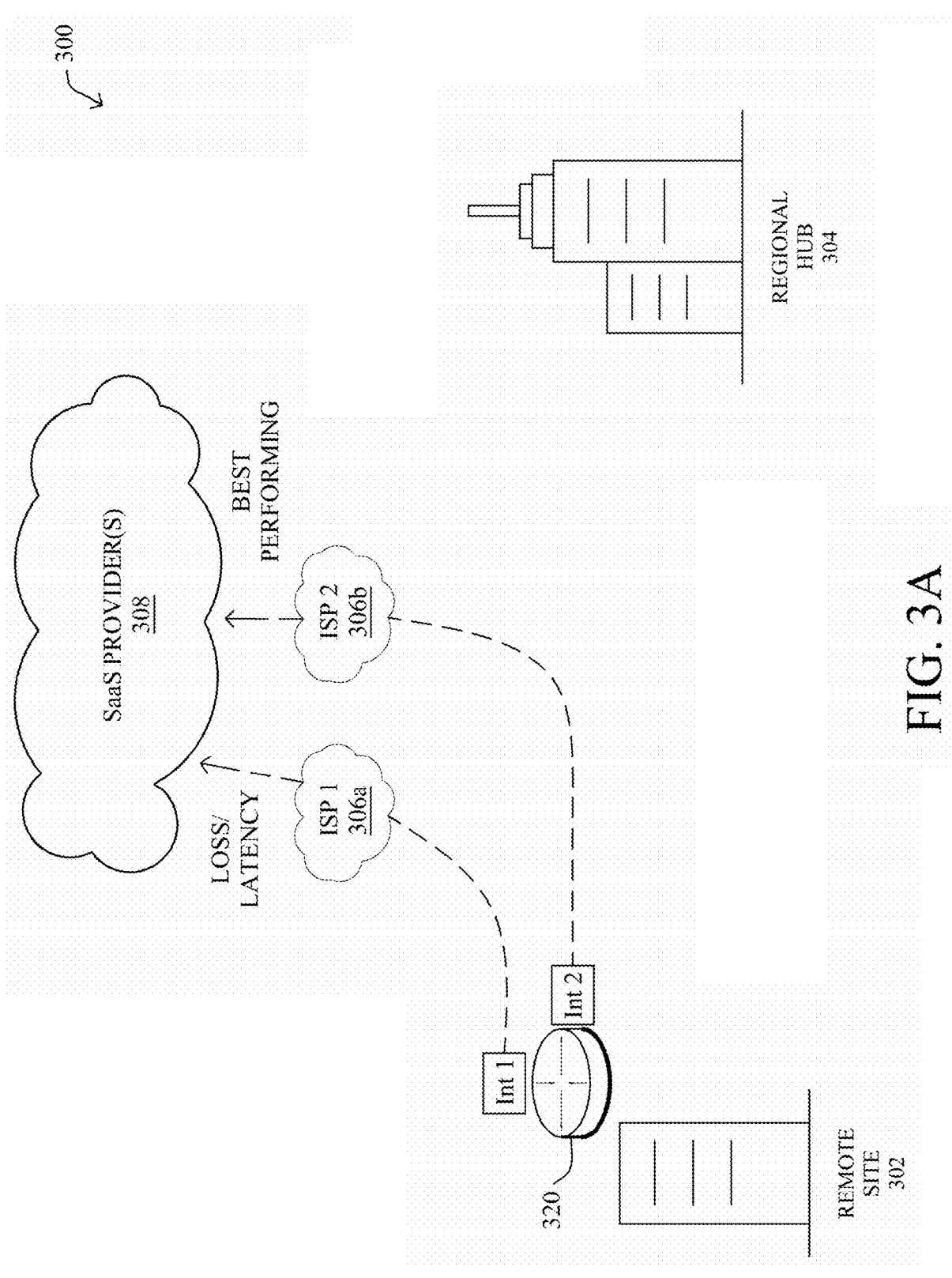
FIGS. 3A-3B illustrate example network deployments.
Figure 3B:

FIGS. 3A-3B illustrate example network deployments (network deployment 300, network deployment 310, respectively). As shown, a router 320 located at the edge of a remote site 302 may provide connectivity between a local area network (LAN) of the remote site 302 and one or more cloud-based, SaaS provider(s) 308. For example, in the case of an SD-WAN, router 320 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and a SaaS provider. For example, as shown in network deployment 300 in FIG. 3A, router 320 may utilize two Direct Internet Access (DIA) connections to connect with SaaS provider(s) 308. More specifically, a first interface of router 320 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 320, Int 2, may establish a backhaul path with SaaS provider(s) 308 via a second ISP 306b, denoted ISP 2 in FIG. 3A.

FIG. 3B illustrates another network deployment 310 in which Int 1 of router 320 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 320 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
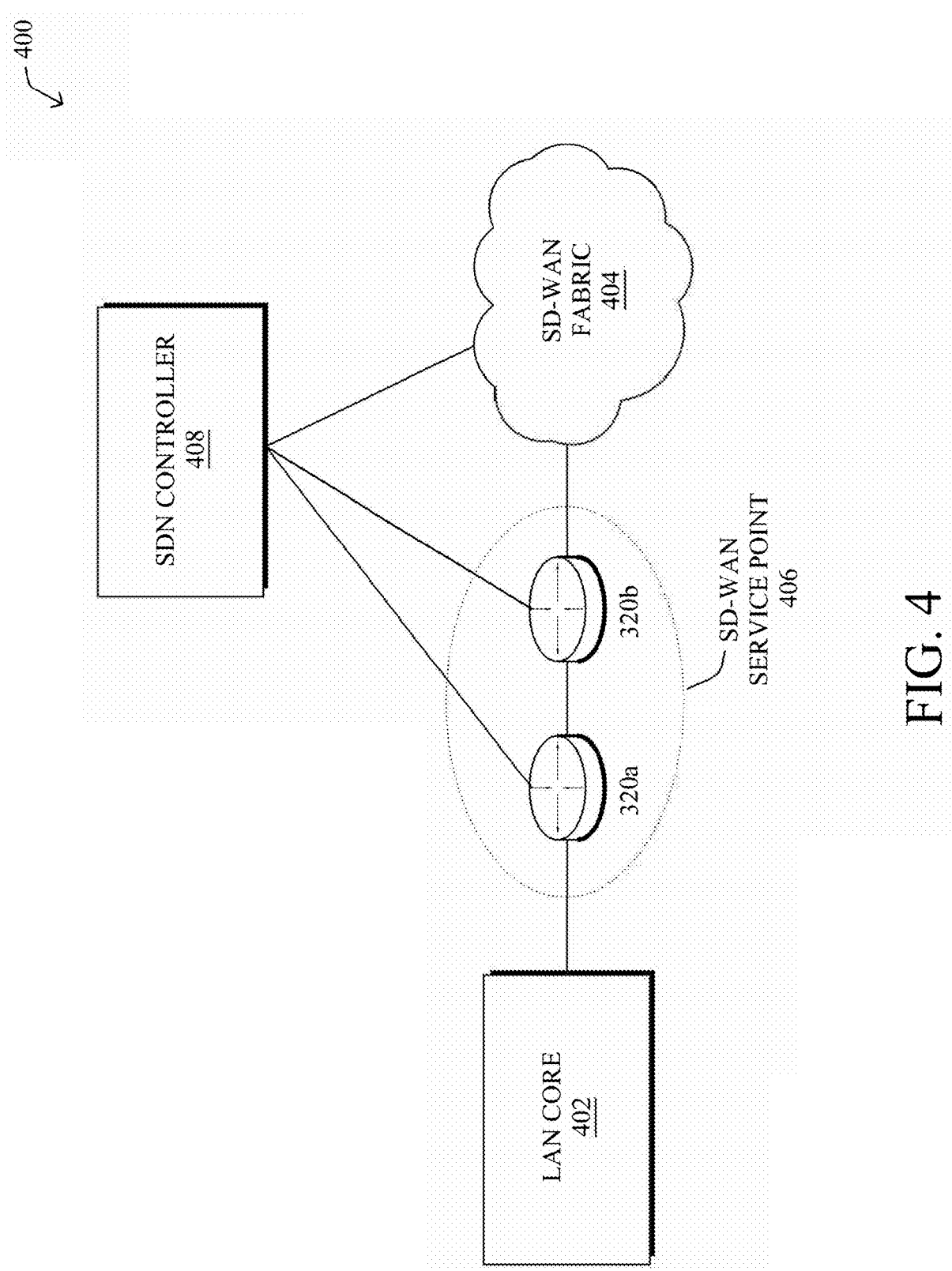
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 320a-320b.

Overseeing the operations of routers 320a-320b in SD-WAN service point 406 and SD-WAN fabric 404 may be an SDN controller 408. In general, SDN controller 408 may comprise one or more devices (e.g., a device 200) configured to provide a supervisory service (e.g., one or more functional processes 246), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

According to various implementations, SDN controller 408 may employ various types of intelligent routing, such as application-aware routing (e.g., to satisfy the requirements of the application) or other intelligent techniques, as opposed to exclusively relying on the shortest path to reach a destination IP address.

Efficient and Secure Hop-by-Hop Routing

As noted above, a packet's path in hierarchical multi-region software defined wide area networks (SD-WANs) involves multiple hub routers along the way, where the packet typically traverses multiple service providers' networks as it flows through these hubs. Also, secure packet forwarding encrypts the packet payload over Internet Protocol Security (IPSec) tunnels using the IPSec credentials of the immediate next-hop router, such that this next-hop router is able to authenticate the packet.

As further noted above, however, the Encapsulating Security Payload (ESP) encryption is also typically done using the IPSec credentials of the immediate next-hop router. As such, each intermediate hub router needs to decrypt the packet to extract the inner IP header for doing IP lookup and then re-encrypt the packet using the IPSec credentials of its immediate next-hop router. Performing such encryption/decryption at each hop along the path is expensive and reduces the traffic throughput. Not only that, but intermediate hubs must be configured with any virtual routing and forwarding (VRF) routes to perform route lookup post decryption.

The techniques herein, therefore, provide for efficient and secure hop-by-hop routing in hierarchical multi-region-fabric networks. In particular, the techniques herein leverages segment routing (e.g., segment routing for IPV6, or "SRv6") to provide a compelling solution for this problem. Specifically, according to one or more embodiments of the disclosure as described in detail below, an illustrative method herein may comprise: receiving, at a device in a computer network, a packet having an unencrypted header and an encrypted segment list, wherein the device is an authorized segment hop device and wherein a destination address within the unencrypted header matches an address of the device; decrypting, by the device and in response to the destination address within the unencrypted header matching the address of the device, the encrypted segment list to expose at least a next segment hop address in the encrypted segment list; replacing, by the device, the destination address within the unencrypted header with the next segment hop address; and forwarding, from the device, the packet toward the next segment hop address along with the encrypted segment list. In another embodiment, an illustrative method may comprise: determining, by a device, a segment list corresponding to a segment route from a source device to a destination device via one or more authorized segment hop devices across a computer network; encrypting, by the device, the segment list into an encrypted segment list using a private key, wherein a public key corresponding to the private key is distributed only to authorized devices of the computer network; and causing, by the device, the encrypted segment list to be carried within packets forwarded from the source device to the destination device, wherein the packets are forwarded through the computer network with the encrypted segment list and an unencrypted header indicating a subsequent segment hop, and wherein only the one or more authorized segment hop devices are configured to decrypt the encrypted segment list to expose at least a next segment hop address and then forward the packets with the encrypted segment list and with the next segment hop address replacing the subsequent segment hop in the unencrypted header.

Figure 5:
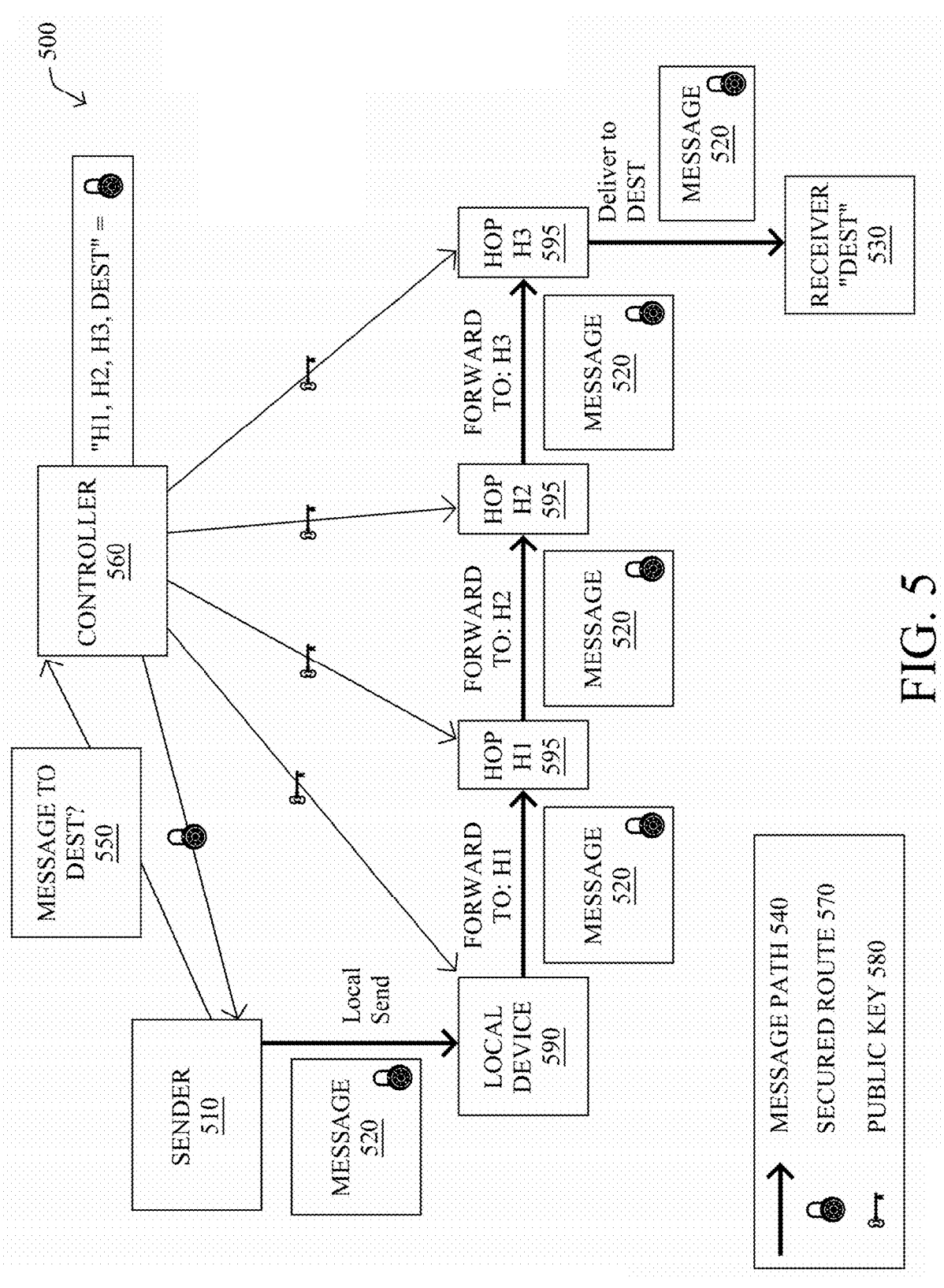
FIG. 5 illustrates a simplified example of efficient and secure hop-by-hop routing in hierarchical multi-region-fabric networks.

To assist in illustrating the problem and solution, FIG. 5 illustrates a high-level demonstration 500 of a secure message delivery system. Assume that a sender 510 wants to send a secure message 520 to a receiver 530, and the message path 540 should not be traced by any unauthorized device. To send the secure message 520, the sender can encrypt the message, and only the receiver could decrypt that secure message 520. Note, however, that traditionally the "source" and "destination" addresses are not encrypted, and the message movement could be traced by any unauthorized intermittent device. According to the techniques described herein, however, a secure, encrypted route would be attached to the message, and the path could not be traced by any unauthorized device, accordingly.

For example, and as described in greater detail below, assume the following sequence of events for the secure hop-by-hop transmission of the secure message 520 from the sender 510 to the receiver 530:

Step 1: A requirement/ask of sender 510 is to send a secure message 520 (e.g., an encrypted packet) to a destination address "DEST" of the receiver 530 (e.g., with low cost) (e.g., request 550).

Step 2: Controller 560 figures out that the low-cost path to DEST is through hops "H1", "H2", and "H3". Note that there may be intermediate devices between these hops, not shown for clarity.

Step 3: A secured route 570 indicative of the path "H1, H2, H3, DEST" would be generated by the controller 560 and provided to the sender 510, where only authorized forwarders can interpret at least a relevant portion of the secured route to be able to send the secure message 520 to the next hop in the list using a shared public key 580.

Step 4: The sender attaches the secured route 570 to the secure message, delivers the message to its local device 590, and the message traverses the path hop-by-hop as only those authorized forwarders 595 (Hops H1, H2, and H3) can read the secured route to determine the next hop, accordingly.

Step 5: The secure message reaches the destination DEST (receiver 530), and the path cannot be traced.

Operationally, this approach may be specifically applied to hierarchical multi-region-fabric (MRF) networks, particularly with an SRv6 underlay, where the burden of encryption overhead at every hop is avoided.

Notably, segment routing is a technique where a traffic steering path is appended by the head-end router. With Segment Routing for IPV6 (SRv6), the path is defined and pushed by a controller to a head-end router, and the path list is embedded into the packet by inserting a Segment Routing Header (SRH). The nodes in the SRv6 domain will then route the packet based on SRH and the destination IP (DIP) address, Notably, the SRH is open and readable by any router in a network.

Figure 6A:
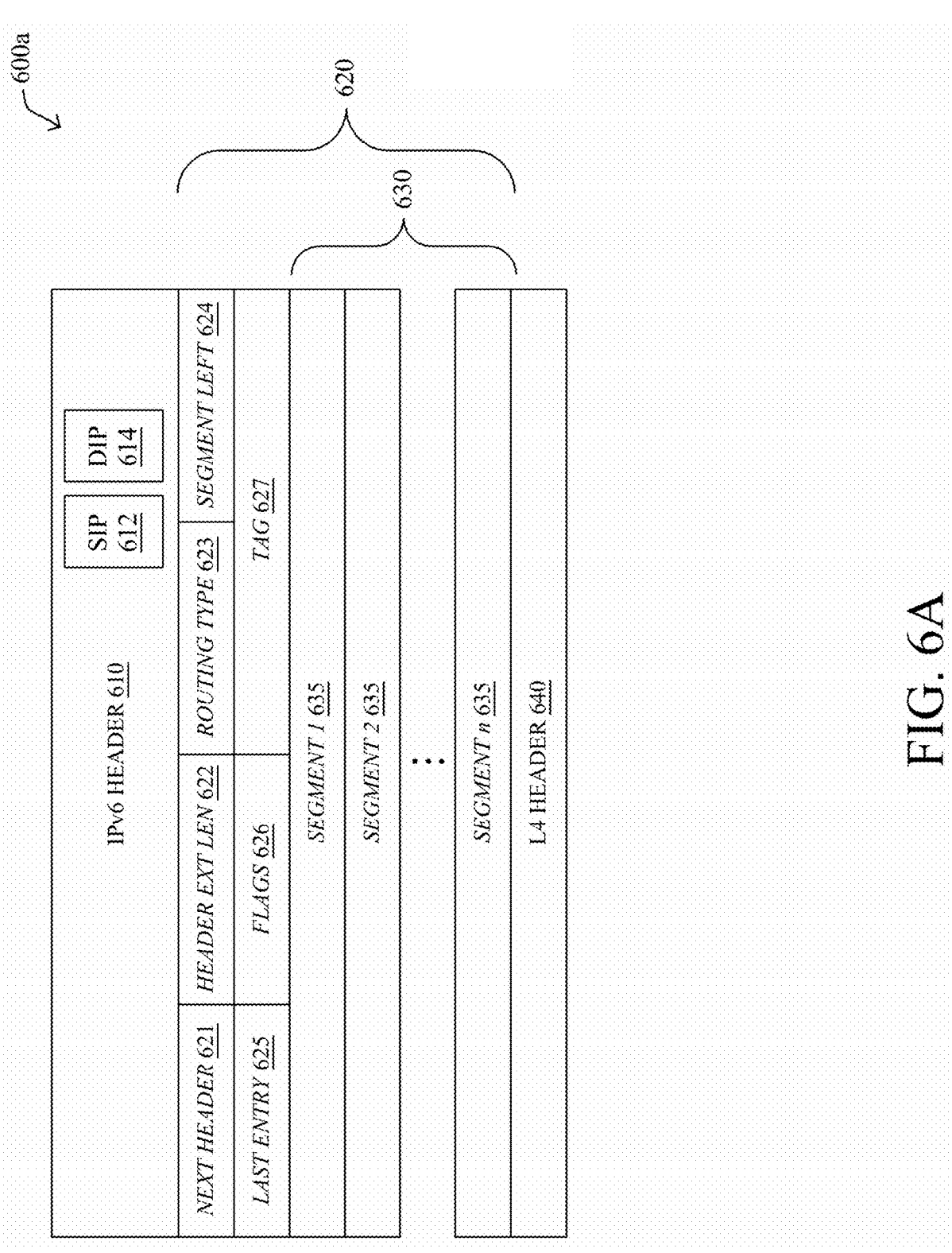
FIGS. 6A-6B illustrate example packet header formats herein.

FIG. 6A illustrates an example of packet headers 600a according to SRv6. In particular, as shown, an IPV6 header 610 may comprise standard information, including a source IP address or SIP 612, and a destination IP address or DIP 614 (and protocol, ports, etc., not shown for clarity). As will be appreciated by those skilled in the art, the segment routing header (SRH 620) may include fields such as "next header 621", "header extension length 622", "routing type 623", "segment left 624", "last entry 625", "flags 626", and "tag 627". Additionally, a segment list 630 may then provide a listing of the individual segments 635 (segment identifiers/IDs) associated with the segment routing path, such as "segment 1", "segment 2", and so on up to a final "segment n". The headers may then have other headers, such as an L4 header 640, and so on.

Figure 6B:
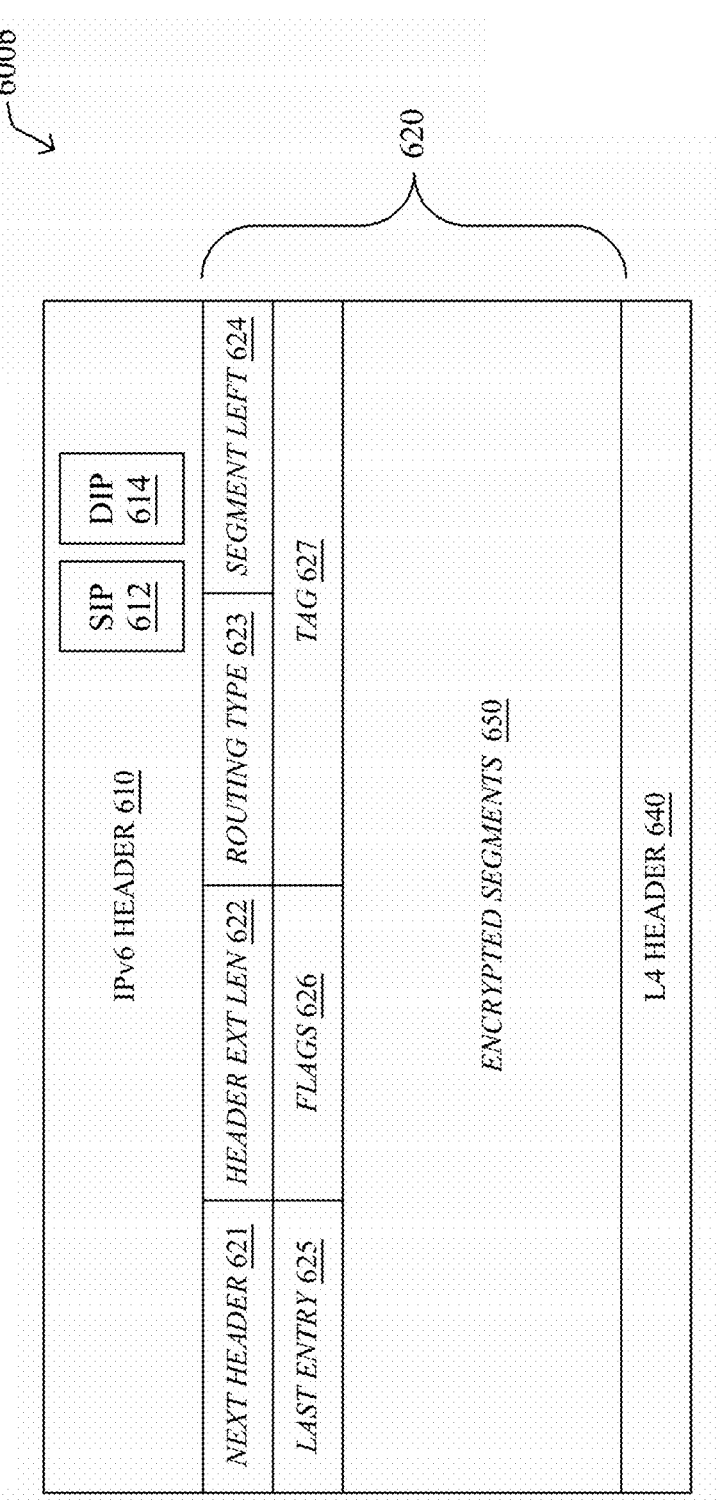

The techniques herein, on the other hand, provide specifically for encrypted segments, meaning that an encrypted list of segment IDs would be attached with the SRH (e.g., similar in function to the secured route 570 described above in the high-level example of FIG. 5). As shown in FIG. 6B, a new format of packet header 600b would then replace the segment list 630, which is openly readable, with an encrypted segment list 650 as shown. Note, that the SRH 620 still has the unencrypted main-header (fields 621-627) and now has the encrypted segment list 650 as detailed herein.

According to the techniques herein, the authorized SRv6 routers in the forwarding path will be correspondingly configured to POP from the encrypted segment list 650, and adjust the segment left 624 field in the SRH 620. As noted above, a shared public key 580 is shared to all authorized devices/hops, such as all MRF border routers (BRs) to decrypt/view the encrypted segment list 650 and to be able to forward to the next segment appropriately. Note that the private key is not shared to these authorized devices/BRs, which means that they are not allowed to encrypt or modify the SRH. Also, in one embodiment, only those required devices/BRs that need to be authorized (which may be in different autonomous domains/regions) may be given the shared public key for SRv6 forwarding.

In particular, according to the techniques herein, a controller may share the public key to edge routers (or sender devices, whichever is configured to perform the initial segment route encryption) and only those required BRs along the route. A corresponding private key can be shared with the edge, or in an alternative embodiment, the controller can push the encrypted segment list to the edges (e.g., such that in this embodiment, the private key is not required to be shared with the edges as well). As such, the edge router (or other sender/source) encrypts the segments (or receives them from the controller, as mentioned) and appends the encrypted list into the SRH, and the whole packet is forwarded to the next BR. The receiving BR POPs the next segment and SWAPs it with the DIP 614. (Segment left is also adjusted before forwarding the packet). There is no encryption performed at the BR, and the packet is forwarded based on the new DIP (i.e., as directed from the SRH).

Figure 7:
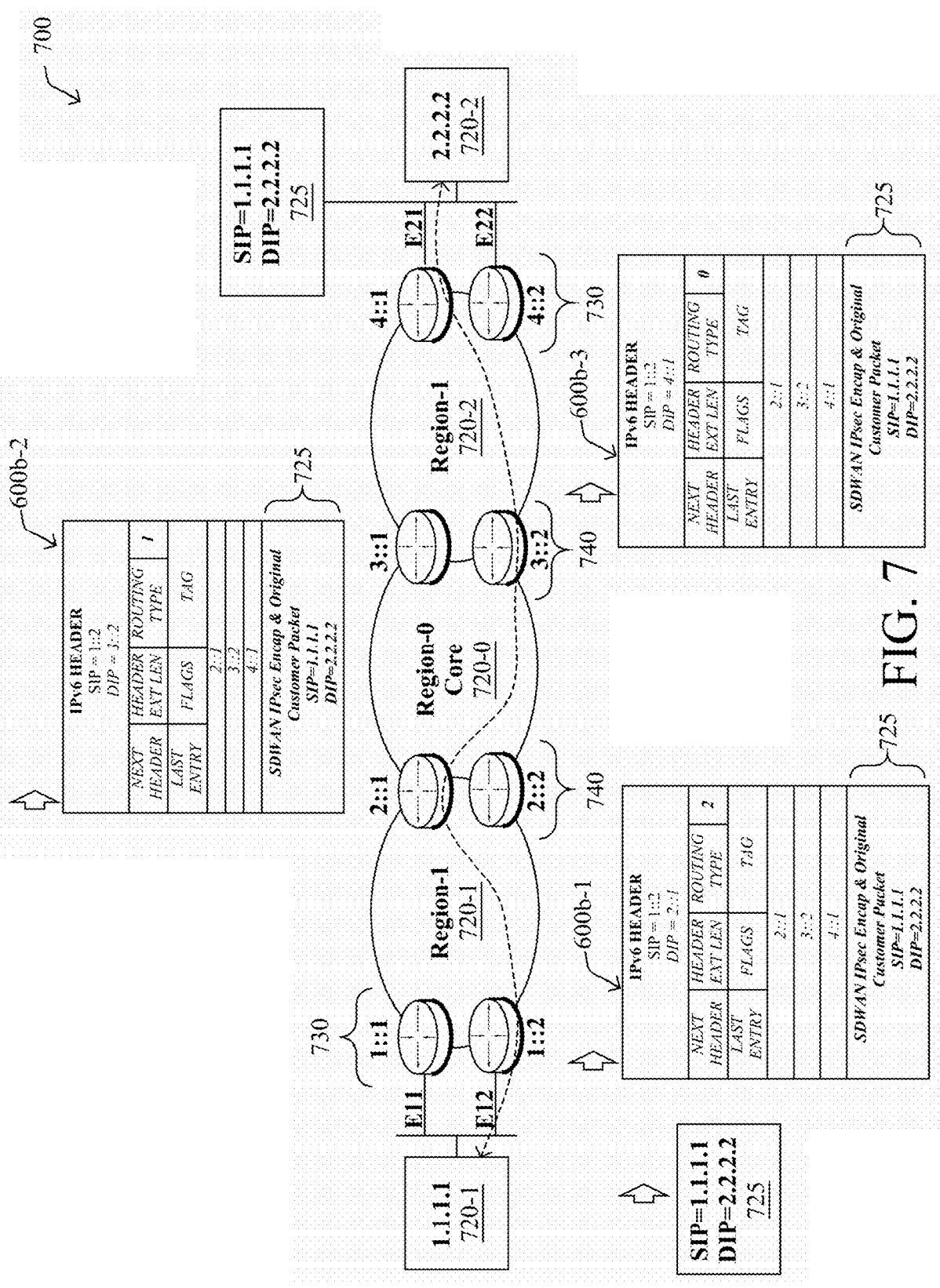
FIG. 7 illustrates another, more detailed, example of efficient and secure hop-by-hop routing in hierarchical multi-region-fabric networks.

FIG. 7 illustrates another, more detailed, example 700 of efficient and secure hop-by-hop routing in hierarchical multi-region-fabric networks, specifically showing the concept of avoiding encryption and decryption at every hop in an MRF. Also, as mentioned above, the path taken cannot be changed/viewed by any in-between unauthorized devices.

In particular, example 700 in FIG. 7 includes a computer network (e.g., a multi-region fabric, MRF) having a number of regions (regions 710), such as Core Region-0 710-0, Region-1 710-1, and Region-2 710-2 between two hosts (end devices 720), namely a sender 720-1 (address 1.1.1.1) and a receiver 720-2 (address 2.2.2.2), where, as detailed below, sender 720-1 wants to send a packet 725 to receiver 720-2 in accordance with the techniques herein (e.g., SIP=1.1.1.1, DIP=2.2.2.2). Edge routers 730 interconnect the end devices 720 to their respective regions, such as the sender being connected to Region-1 via edge routers E11

(address 1::1) and E12 (address 1::2), and the receiver being connected to Region-2 via edge routers E21 (address 4::1) and E22 (address 4::2). The outer regions may then be interconnected to each other via one or more core regions by border routers 740, such as Region-1 being connected to Region-0 via border routers BR11 (address 2::1) and BR12 (address 2::2), and Region-2 being connected to Region-0 via border routers BR21 (address 3::1) and BR22 (address 3::2).

Assume, as mentioned, that Host 1.1.1.1 (sender 720-1) sends traffic (e.g., packet 725) to Host 2.2.2.2 (receiver 720-2) in the above MRF topology. According to the techniques herein, the following steps are involved while forwarding on an illustrative SRv6-based underlay network:

1) E12 receives traffic from 1.1.1.1 and assume the routing requirement (from a controller, as mentioned above) is to route using BR11, BR22 and E21.

1.1) Segment list [2::1, 3::2, 4::1] will be encrypted using a private key. (Note: the private key is only known to E12, provided by a controller.) The Encrypted Segment list is appended to the SRH as described herein.

1.2) E12 encrypts E21's SDWAN IPsec Security Association.

1.3) The traffic is sent to BR11 as the DIP is 2::1.

2) BR11 receives the packet and decrypts the segment list from the SRH (Note: The public key to decrypt is provided to BR11 by the controller in advance.)

2.1) BR11 can only view the segment list, but it cannot alter it as it does not have private key.

2.2) BR11 POPs the 3::2 segment and SWAPs with the DIP, and also alters Segment Left field (e.g., from "2" to "1").

2.3) There is no need to decrypt the inner SDWAN IPSec packet as the next-hop is POPed from the SRH.

2.4) Also, there is no need to re-encrypt the segment list as it is already encrypted.

3) The packet is sent to BR22 and it also forwards it on in the same manner as BR11 (BR12 POPs the 4::1 segment and SWAPs with the DIP, and also alters Segment Left field (e.g., from "1" to "0").)

4) The packet is received by E21, which removes the SRH and performs standard SDWAN IPsec decryption, and then forwards the original packet (packet 725) to end device 2.2.2.2.

Note that the public key would be shared to all region/provider BRs to view/decrypt the SRH, though the private key should (e.g., must) be kept within the local region. Also, in one embodiment herein, the public and private keys should be rekeyed occasionally in order to prevent against key hacking from prolonged key usage.

The techniques herein, therefore, use the encrypted segment list to avoid decryption/encryption at every hop in an MRF topology. Also, the techniques herein provide the benefit that SDWAN IPsec Security Credentials are not required to be shared with any another region providers (e.g., Region-0 is not required to be programmed with the edge router's security associations). Another benefit is that since the segment list from the SRH is encrypted, it is not possible to trace the packet forwarding path without the public key. The techniques herein thus provide a "secure path" (not merely a shortest path) between end points, where the hop-by-hop segment information is hidden from any unauthorized devices (e.g., keys shared only with fabric tunnel endpoints), and only a minimal amount of necessary information is contained within a visible outer header to allow for intermediate device forwarding, accordingly.

In closing, FIG. 8 illustrates an example simplified procedure for efficient and secure hop-by-hop routing in hierarchical multi-region-fabric networks in accordance with one or more embodiments described herein, particularly from the perspective of an authorized forwarding device (e.g., border router). For example, a non-generic, specifically configured device (e.g., device 200, an apparatus) may perform procedure 800 by executing stored instructions (e.g., process 248). The procedure 800 may start at step 805, and continues to step 810, where, as described in greater detail above, the device receives a packet having an unencrypted header and an encrypted segment list, wherein the device is an authorized segment hop device and wherein a destination address within the unencrypted header matches an address of the device.

In step 815, the device decrypts, in response to the destination address within the unencrypted header matching the address of the device, the encrypted segment list to expose at least a next segment hop address in the encrypted segment list.

In step 820, the device replaces the destination address within the unencrypted header with the next segment hop address. Then, in step 825, the device forwards the packet toward the next segment hop address along with the encrypted segment list.

Procedure 800 may end at step 830.

In one embodiment, the procedure further comprises: receiving, as the authorized segment hop device, a public key from a controller for decrypting the encrypted segment list.

In one embodiment, the encrypted segment list, when decrypted, is view-only to the device.

In one embodiment, the packet is formatted as a Segment Routing for Internet Protocol version 6 packet.

In one embodiment, the packet comprises an encrypted Software-Defined Wide Area Network Internet Protocol Security tunneled packet that remains un-decrypted while forwarding. In one embodiment, a last segment hop for the packet decrypts the packet before forwarding toward a final destination device.

In one embodiment, the computer network comprises a hierarchical multi-region fabric.

In one embodiment, the procedure further comprises: rekeying keys used for decrypting the encrypted segment list with a controller.

In one embodiment, the procedure further comprises: reducing a segment left field by one segment prior to forwarding the packet.

Additionally, FIG. 9 illustrates an example simplified procedure for efficient and secure hop-by-hop routing in hierarchical multi-region-fabric networks in accordance with one or more embodiments described herein, particularly from the perspective of an encapsulating device (e.g., controller or sending/edge device). For example, a non-generic, specifically configured device (e.g., device 200, an apparatus) may perform procedure 900 by executing stored instructions (e.g., process 248). The procedure 900 may start at step 905, and continues to step 910, where, as described in greater detail above, the device determines a segment list corresponding to a segment route from a source device to a destination device via one or more authorized segment hop devices across a computer network. In step 915, the device encrypts the segment list into an encrypted segment list using a private key, wherein a public key corresponding to the private key is distributed only to authorized devices of the computer network.

In step 920, the device causes the encrypted segment list to be carried within packets forwarded from the source device to the destination device, wherein the packets are forwarded through the computer network with the encrypted segment list and an unencrypted header indicating a subsequent segment hop.

Thereafter, in step 925, only the one or more authorized segment hop devices are configured to decrypt the encrypted segment list to expose at least a next segment hop address and then forward the packets with the encrypted segment list and with the next segment hop address replacing the subsequent segment hop in the unencrypted header.

Procedure 900 may end at step 930.

In one embodiment, the device is a controller within the computer network. In one embodiment, causing comprises: sending the encrypted segment list to an edge device to add the encrypted segment list to the packets when received from the source device. In one embodiment, the edge device does not have the private key.

In one embodiment, the device is one of either the source device or an edge device associated with the source device. In one embodiment, causing comprises: encapsulating the packets within an encapsulation containing the encrypted segment list. In one embodiment, determining comprises: obtaining the segment list from a controller.

In one embodiment, the packets are formatted as a Segment Routing for Internet Protocol version 6 packets.

In one embodiment, the packets comprise encrypted Software-Defined Wide Area Network Internet Protocol Security tunneled packets that remain un-decrypted while forwarded across the computer network.

In one embodiment, the procedure further comprises: rekeying the private key and the public key.

It should be noted that while certain steps within the procedures above may be optional as described above, the steps shown in the procedures above are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may have been described separately, certain steps from each procedure may be incorporated into each other procedure, and the procedures are not meant to be mutually exclusive.

The techniques described herein, therefore, provide for efficient and secure hop-by-hop routing in hierarchical multi-region-fabric networks. In particular, the techniques herein build on top of the basic SRH header concept provided by IETF standards in a manner that adds significant enhancements to handle MRF route re-origination and SDWAN security requirements, addressing security concerns discussed within the SRv6 community. For instance, according to the techniques herein, known security issues, such as spoofing of SRH and topology discovery (traffic path tracing) cannot be done by any unauthorized node/person. Moreover, the techniques herein ensure that the intermediate nodes cannot modify the path (i.e., where only the public key is provided for decryption).

Other techniques to address the issues noted above use label forwarding and separate IPSec security associations for ESP and AH, which is more cumbersome than using IP forwarding (e.g., with SRv6) as in the present disclosure. Other techniques use different encryption for ESP and AH, but this approach requires route lookup for the ultimate destination on the first-hop hub as well, unlike the techniques herein where the SRH header will guide the path of the packet through multiple hops, accordingly. Note, too, that the techniques herein do not encrypt the complete packet, but rather they encrypt only the required portion of the SRH (i.e., encrypted segment list 650).

Illustratively, the techniques described herein may be performed by hardware, software, and/or firmware, (e.g., an "apparatus") such as in accordance with the routing process, process 248, e.g., a "method"), which may include computer-executable instructions executed by the processor(s) 220 to perform functions relating to the techniques described herein, e.g., in conjunction with corresponding processes of other devices in the computer network as described herein (e.g., on agents, controllers, computing devices, servers, etc.). In addition, the components herein may be implemented on a singular device or in a distributed manner, in which case the combination of executing devices can be viewed as their own singular "device" for purposes of executing the process (e.g., process 248).

In some implementations, an illustrative apparatus herein may comprise: one or more network interfaces to communicate with a network; a processor coupled to the one or more network interfaces and configured to execute one or more processes; and a memory configured to store a process that is executable by the processor, the process comprising: receiving, as a device, a packet having an unencrypted header and an encrypted segment list, wherein the device is an authorized segment hop device and wherein a destination address within the unencrypted header matches an address of the device; decrypting, in response to the destination address within the unencrypted header matching the address of the device, the encrypted segment list to expose at least a next segment hop address in the encrypted segment list; replacing the destination address within the unencrypted header with the next segment hop address; and forwarding the packet toward the next segment hop address along with the encrypted segment list.

In still other implementations, a tangible, non-transitory, computer-readable medium storing program instructions that cause a device to execute a process comprising: receiving a packet having an unencrypted header and an encrypted segment list, wherein the device is an authorized segment hop device and wherein a destination address within the unencrypted header matches an address of the device; decrypting, in response to the destination address within the unencrypted header matching the address of the device, the encrypted segment list to expose at least a next segment hop address in the encrypted segment list; replacing the destination address within the unencrypted header with the next segment hop address; and forwarding the packet toward the next segment hop address along with the encrypted segment list.

In some further implementations, another illustrative apparatus herein may comprise: one or more network interfaces to communicate with a network; a processor coupled to the one or more network interfaces and configured to execute one or more processes; and a memory configured to store a process that is executable by the processor, the process comprising: determining, as a device, a segment list corresponding to a segment route from a source device to a destination device via one or more authorized segment hop devices across a computer network; encrypting the segment list into an encrypted segment list using a private key, wherein a public key corresponding to the private key is distributed only to authorized devices of the computer network; and causing the encrypted segment list to be carried within packets forwarded from the source device to the destination device, wherein the packets are forwarded through the computer network with the encrypted segment list and an unencrypted header indicating a subsequent segment hop, and wherein only the one or more authorized segment hop devices are configured to decrypt the encrypted segment list to expose at least a next segment hop address and then forward the packets with the encrypted segment list and with the next segment hop address replacing the subsequent segment hop in the unencrypted header.

In still other further implementations, another tangible, non-transitory, computer-readable medium storing program instructions that cause a device to execute a process comprising: determining a segment list corresponding to a segment route from a source device to a destination device via one or more authorized segment hop devices across a computer network; encrypting the segment list into an encrypted segment list using a private key, wherein a public key corresponding to the private key is distributed only to authorized devices of the computer network; and causing the encrypted segment list to be carried within packets forwarded from the source device to the destination device, wherein the packets are forwarded through the computer network with the encrypted segment list and an unencrypted header indicating a subsequent segment hop, and wherein only the one or more authorized segment hop devices are configured to decrypt the encrypted segment list to expose at least a next segment hop address and then forward the packets with the encrypted segment list and with the next segment hop address replacing the subsequent segment hop in the unencrypted header.

While there have been shown and described illustrative implementations above, it is to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, architectures, schemes, workloads, languages, etc., and associated devices have been shown, other suitable alternatives may be implemented in accordance with the techniques described above. In addition, while certain devices are shown, and with certain functionality being performed on certain devices, other suitable devices and process locations may be used, accordingly. For instance, while the techniques herein have been described in terms specifically of SRv6, other suitable protocols may also take advantage of the techniques herein, such as segment routing for MPLS (SR-MPLS), or other segment routing protocols.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:

receiving, at a device in a computer network, a packet having an unencrypted header and an encrypted segment list, wherein the device is an authorized segment hop device and wherein a destination address within the unencrypted header matches an address of the device, wherein the encrypted segment list is encrypted using a private key;

decrypting, by the device and in response to the destination address within the unencrypted header matching the address of the device, the encrypted segment list to expose at least a next segment hop address in the encrypted segment list, wherein decrypting comprises decrypting the encrypted segment list using a public key received from a controller;

replacing, by the device, the destination address within the unencrypted header with the next segment hop address; and forwarding, from the device, the packet toward the next segment hop address along with the encrypted segment list.

2. The method of claim 1, wherein the encrypted segment list, when decrypted, is view-only to the device.

3. The method of claim 1, wherein the packet is formatted as a Segment Routing for Internet Protocol version 6 packet.

4. The method of claim 1, wherein the packet comprises an encrypted Software-Defined Wide Area Network Internet Protocol Security tunneled packet that remains un-decrypted while forwarding.

5. The method of claim 4, wherein a last segment hop for the packet decrypts the packet before forwarding toward a final destination device.

6. The method of claim 1, wherein the computer network comprises a hierarchical multi-region fabric.

7. The method of claim 1, further comprising:

rekeying keys used for decrypting the encrypted segment list with a controller.

8. The method of claim 1, further comprising:

reducing a segment left field by one segment prior to forwarding the packet.

9. A method, comprising:

determining, by a device, a segment list corresponding to a segment route from a source device to a destination device via one or more authorized segment hop devices across a computer network;

encrypting, by the device, the segment list into an encrypted segment list using a private key, wherein a public key corresponding to the private key is distributed only to authorized devices of the computer network; and causing, by the device, the encrypted segment list to be carried within packets forwarded from the source device to the destination device, wherein the packets are forwarded through the computer network with the encrypted segment list and an unencrypted header indicating a subsequent segment hop, and wherein only the one or more authorized segment hop devices are configured to decrypt the encrypted segment list using the public key to expose at least a next segment hop address and then forward the packets with the encrypted segment list and with the next segment hop address replacing the subsequent segment hop in the unencrypted header.

10. The method of claim 9, wherein the device is a controller within the computer network.

11. The method of claim 10, wherein causing comprises:

sending the encrypted segment list to an edge device to add the encrypted segment list to the packets when received from the source device.

12. The method of claim 11, wherein the edge device does not have the private key.

13. The method of claim 9, wherein the device is one of either the source device or an edge device associated with the source device.

14. The method of claim 13, wherein causing comprises:

encapsulating the packets within an encapsulation containing the encrypted segment list.

15. The method of claim 13, wherein determining comprises:

obtaining the segment list from a controller.

16. The method of claim 9, wherein the packets are formatted as a Segment Routing for Internet Protocol version 6 packets.

17. The method of claim 9, wherein the packets comprise encrypted Software-Defined Wide Area Network Internet Protocol Security tunneled packets that remain un-decrypted while forwarded across the computer network.

18. The method of claim 9, further comprising:

rekeying the private key and the public key.

19. An apparatus, comprising:

one or more network interfaces to communicate with a network;

a processor coupled to the one or more network interfaces and configured to execute one or more processes; and a non-transitory memory configured to store a process that is executable by the processor, the process comprising:

receiving, as a device, a packet having an unencrypted header and an encrypted segment list, wherein the device is an authorized segment hop device, wherein a destination address within the unencrypted header matches an address of the device, wherein the encrypted segment list is encrypted using a private key;

decrypting, in response to the destination address within the unencrypted header matching the address of the device, the encrypted segment list to expose at least a next segment hop address in the encrypted segment list, wherein decrypting comprises decrypting the encrypted segment list using a public key received from a controller;

replacing the destination address within the unencrypted header with the next segment hop address; and forwarding the packet toward the next segment hop address along with the encrypted segment list.

* * * * *